(12) United States Patent
Selak et al.

(10) Patent No.: US 7,934,918 B2
(45) Date of Patent: May 3, 2011

(54) INJECTION MOLDING TOOL WITH CLOSABLE HOT CHANNEL NOZZLE

(75) Inventors: Vincenc Selak, Rhinau (FR); Swen Spuller, Forchheim (DE)

(73) Assignee: Otto Männer Innovation GmbH, Bahlingen (DE)

( * ) Notice: Subject to any disclaimer, the term of this patent is extended or adjusted under 35 U.S.C. 154(b) by 0 days.

(21) Appl. No.: 12/462,977

(22) Filed: Aug. 12, 2009

(65) Prior Publication Data

US 2010/0047379 A1 Feb. 25, 2010

(30) Foreign Application Priority Data

Aug. 22, 2008 (DE) .................. 10 2008 039 336

(51) Int. Cl.
*B29C 45/23* (2006.01)

(52) U.S. Cl. ......... 425/145; 264/564; 425/146; 425/564

(58) Field of Classification Search .................. 425/145, 425/146, 564, 566; 264/328.9
See application file for complete search history.

(56) References Cited

U.S. PATENT DOCUMENTS

| | | | | |
|---|---|---|---|---|
| 5,055,025 A | | 10/1991 | Muller | |
| 5,055,026 A | * | 10/1991 | Gordon | 425/146 |
| 5,149,547 A | * | 9/1992 | Gill | 425/145 |
| 5,238,378 A | * | 8/1993 | Gellert | 425/564 |
| 5,531,581 A | * | 7/1996 | Donnell, Jr. | 425/145 |
| 5,556,582 A | * | 9/1996 | Kazmer | 264/40.1 |
| 5,599,568 A | * | 2/1997 | Donnell, Jr. | 425/562 |
| 6,464,909 B1 | * | 10/2002 | Kazmer et al. | 425/564 |
| 6,746,228 B2 | * | 6/2004 | Sattler et al. | 425/145 |
| 6,824,379 B2 | | 11/2004 | Doyle et al. | |
| 6,884,061 B2 | * | 4/2005 | Okamura et al. | 425/557 |
| 7,044,728 B2 | * | 5/2006 | Schunck et al. | 425/562 |
| 7,588,436 B2 | * | 9/2009 | Tooman et al. | 425/146 |

FOREIGN PATENT DOCUMENTS

| | | |
|---|---|---|
| DE | 38 33 220 A1 | 4/1990 |
| DE | 38 33 220 C2 | 4/1990 |
| DE | 198 57 735 A1 | 6/2000 |
| DE | 20 2006 005404 U1 | 6/2006 |
| DE | 20 2006 008 988 U1 | 11/2007 |
| EP | 0936 048 A | 8/1999 |
| EP | 1 223 020 A | 7/2002 |
| JP | 04 112020 | 4/1992 |
| WO | 02/066224 A | 8/2002 |

OTHER PUBLICATIONS

Kazmer D. et al "Multi-cavity Pressure Control in the Filling and Packing Stages of the Injection Molding Process", Polymer Engineering & Science, Wiley, Hoboken, NJ vol. 37 No. 11. Nov. 1, 1997 pp. 1865-1879, xp000776243, issn: 0032-3888, p. 1868, Left Col, Fig.3, p. 1874, left col.

* cited by examiner

*Primary Examiner* — Tim Heitbrink
(74) *Attorney, Agent, or Firm* — Klaus J. Bach

(57) ABSTRACT

In an injection molding tool with at least one hot channel nozzle (1), which is provided with a discharge nozzle opening (1*a*) and a closure needle (2) for closing the nozzle opening, an element (3) is provided by which at least the closing position of the closure needle can be monitored.

5 Claims, 2 Drawing Sheets

INJECTION MOLDING TOOL WITH CLOSABLE HOT CHANNEL NOZZLE

BACKGROUND OF THE INVENTION

The invention relates to an injection molding tool with at least one hot channel nozzle having a discharge opening which can be closed by a closure needle.

Such an injection molding tool is well-known in the state of the art and is almost routinely used in the manufacture of plastic parts. Since the discharge openings of the hot channel nozzle can be closed by a closure needle, plastic parts can be manufactured with a gate mark which is barely noticeable. That means that, with the known injection molding tools, plastic parts of very high quality can be manufactured.

It is however possible that the closure needle does not completely close the discharge opening. The reason may be for example a cooled plastic plug in the discharge opening. If, as a result, the discharge opening is not properly closed, this results in negative consequences to the gate mark of the plastic part. At the gate mark of the plastic part, there remains a feed head which may result in the plastic part to become a reject.

Since often such faults are not readily recognized, a multitude of unusable plastic parts may be produced. Obviously, this is very disadvantageous.

It is the object of the present invention to provide an injection molding tool of the type described above which is so designed that it can be determined whether the discharge opening of the hot channel nozzle is being closed by the closure needle.

SUMMARY OF THE INVENTION

In an injection molding tool with at least one hot channel nozzle which includes a discharge opening that can be closed by a closure needle, an element is provided by means of which at least the position of the closure needle can be monitored so that an operating error of the closure needle can be readily recognized and corrected.

Since there is an element by means of which at least one position of the closure needle can be monitored, it can easily be determined whether the discharge opening is closed. To this end, at least the position of the closure needle must be monitored in which the closure needle is disposed in the discharge opening, that is, in which the discharge opening is closed. When this position of the closure needle is determined, it means that the discharge opening is closed. By monitoring this position of the closure needle, it can therefore indirectly be determined whether the discharge opening is being closed.

If it is determined that, at a point in time when the discharge opening should be closed, the closure needle is not in the position in which it closes the discharge opening this indicates that the discharge opening is not closed. As a result, measures can be initiated for the elimination of the fault resulting in such an indication. Since the error can be immediately recognized the number of unusable plastic parts produced is very small.

An embodiment of the invention wherein the element for monitoring the position of the closure needle is in the form of an electrical contactor has been found to be very advantageous. This permits for example the arrangement of a switch in the injection molding tool which is so adjusted that it closes exactly when the closure needle is in the closing position.

If in an injection molding tool in which the closure needle is movable into the closing position by an operating element, it is particularly advantageous if the element for monitoring the position of the closure needle is in the form of a switch of which a first contact is connected to the operating element and a second contact is provided at a stop which is engaged by the operating element when the nozzle is in the closed position.

Such an embodiment is particularly advantageous if the operating element is in the form of a pneumatic cylinder since, in this case, the first contact of the switch may be formed by the piston and the second contact of the switch may be formed by an electrically insulated element in the respective wall of the cylinder housing which forms the stop for the piston in the closing position of the closure needle. Such an arrangement can be provided inexpensively and, furthermore, permits the retrofitting in already existing injection molding tools. For such retrofitting installations, it is only necessary to exchange the respective pneumatic cylinder with a pneumatic cylinder according to the present invention.

The element for monitoring the position of the closure needle however may also be in the form of a proximity sensor. A proximity sensor can generally be arranged in an injection molding tool without any problems.

It has been found to be advantageous to position such a proximity sensor at a distance from the piston of the cylinder by which the closure needle is operated. The proximity sensor is then activated by the stroke of the piston.

In another special embodiment of the invention, a force sensor is arranged between the operating element and the closure needle. Since the force applied to the closure needle increases when the closure needle cannot be moved to the desired closure position, that is, the position in which it is properly disposed in the discharge opening, and since the increased force can be determined by the force sensor, the force sensor consequently also forms an element for monitoring the position of the closure needle. The force sensor can therefore be provided in place of an electric switch or a proximity sensor. But it may also be used additionally whereby the reliability of the position monitoring is increased.

Preferably, such a force sensor is in the form of a piezo element which can be arranged in the injection molding tool in a particularly simple manner.

Further particulars, features and advantages of the present invention will become apparent from the following description of particular embodiments of the invention with reference to the accompanying drawing.

DESCRIPTION OF PREFERRED EMBODIMENTS

Figure 1:
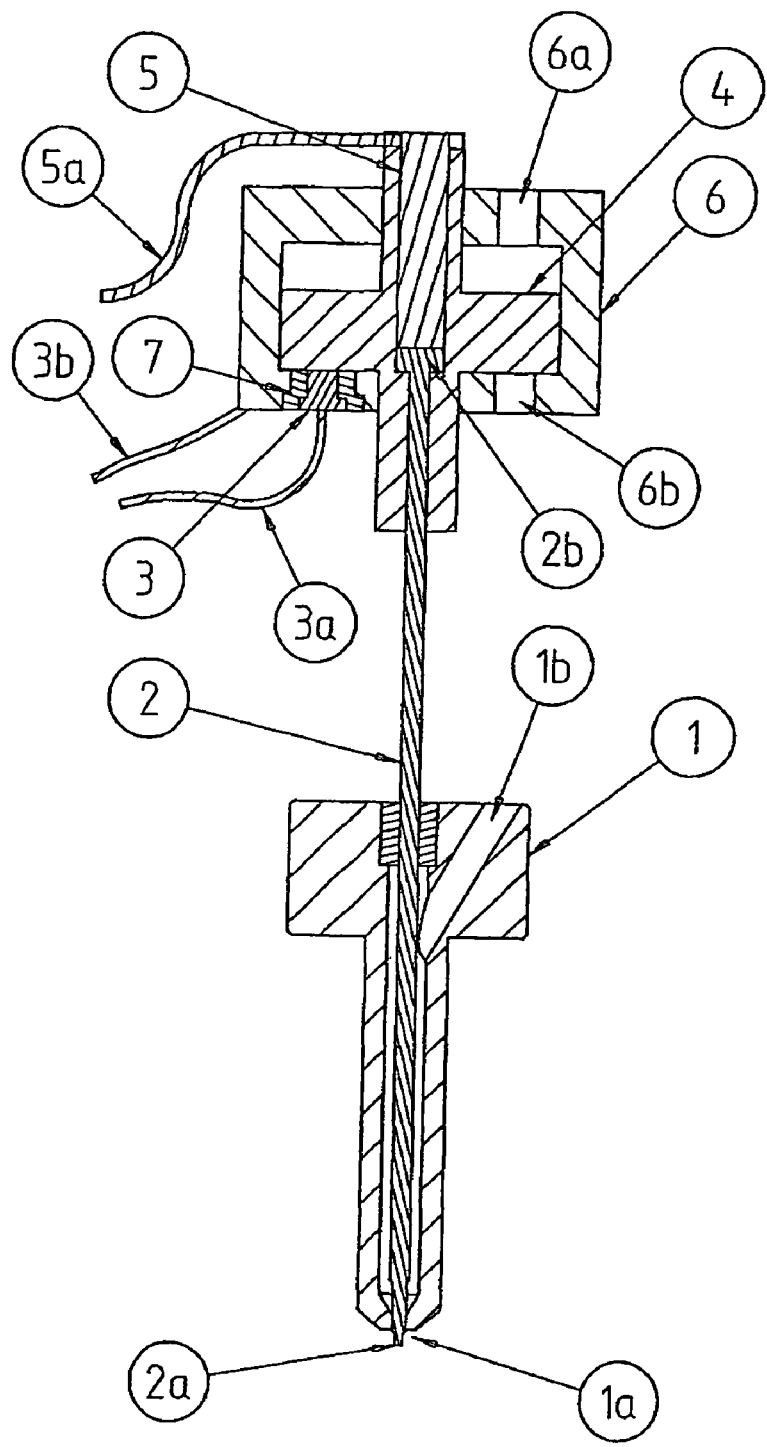
FIG. 1 is a schematic representation of a first arrangement according to the invention.

As apparent from FIG. 1, an injection molding nozzle 1 includes a discharge opening 1a for a molten material which is supplied via a molten material channel 1b. The discharge opening 1a can be closed by means of a closure needle 2, which is axially movably disposed in the hot channel nozzle 1. For closing the discharge opening 1a, the closure needle 2 is moved to a position in which its tip 2a is in the discharge opening 1. This position is shown in FIG. 1.

For adjusting the closure needle 2, the end 2b opposite the tip 2a, which has a stepped area of increased diameter, is connected to the piston 4 of a pneumatic cylinder. By supplying compressed air via a first opening 6a to the cylinder housing 6, the piston 4 is biased toward the lower wall of the housing 6, whereby the tip 2a of the closure needle 2 enters the discharge opening 1a and closes the opening. By supplying compressed air via a second opening 6b, the piston 4 is biased toward the opposite wall of the housing 6. In this position, the tip 2a of the closure needle 2 is no longer disposed in the discharge opening 1a so that the discharge opening is opened.

In the lower wall of the cylinder housing 6 against which the piston 4 is pressed when the closure needle 2 is in the closing position, an electric contact structure 3 is arranged by means of an electrically non-conductive sleeve 7. Between the electric contact structure 3 and the piston 4, an electric conductive connection is only then provided when the piston 4 abuts the lower wall of the cylinder housing 6, that is, when the closure needle 2 is in the closing position. When the closure needle 2 is not in the closing position that is, when the piston 4 does not abut the lower wall of the cylinder housing 6, no electrically conductive connection between the piston 4 and the contact 3 is established. The piston 4 and the contact 3 consequently form an electric switch which is closed only when the closure needle 2 is in its closing position.

Since the piston 4 is disposed in electrically conductive contact with the cylinder housing 6, the switching signal can be picked up at the cylinder housing and also at the contact 3.

To this end, the contact 3 is connected to a first signal line 3a and the cylinder housing 6 is connected to a second signal line 3b. The first signal line 3a and the second signal line 3b are connected to a control device which is not shown in the drawings.

Above the closure needle 2, a piezo element 5 is arranged which is connected to the piston 4 and which therefore exerts a force on the end 2b of the closure needle 2 remote from the needle tip 2a when the needle 2 is biased into its closing position. The signal generated by the piezo element 5 is supplied via a third signal line 5a to the control device which is not shown in FIG. 1.

When, by the admission of compressed air via the first opening 6a, a force is applied to the piston 4 in the direction toward the lower wall of the cylinder housing 6, the piezo element 5 presses onto the end 2b of the closure needle 2 remote from the closure needle tip 2a. In this way, the closure needle 2 is moved to its closing position.

If the discharge opening 1a is closed for example by a cool plastic plug, the tip 2a of the closure needle 2 cannot enter the discharge opening 1a. The piston 4 therefore cannot abut the lower wall of the cylinder housing 6 so that it cannot form an electrical contact with the contact structure 3. The first signal line 3a is therefore not in contact with the second signal line 3b. In this way, the control device which is not shown in FIG. 1 recognizes that the closure needle 2 is not in its closing position, that is, that the discharge opening 1a is not closed. If this occurs at a point in time when the discharge opening 1a should be closed the control device notices that an error has occurred.

Since the piston 4 does not abut the lower wall of the cylinder housing 6, the counter force effective on the piston 4 is not provided by the lower wall of the cylinder housing 6 but by the closure needle 2. And since the closure needle 2 is not directly connected to the piston 4 but via the piezo element 5, this counterforce is transmitted to the piston via the piezo element 5 and can be determined by the piezo element 5. The corresponding signal is transmitted, via the third signal line 5a to the control device which is not shown in the drawings.

If the piezo element 5 provides a corresponding signal at a point in time, when the discharge opening 1a should be closed, this indicates that the piston 4 does not abut the lower wall of the cylinder housing 6 and the counter force effective on the piston 4 is not provided by the lower wall of the cylinder but that the piston is spaced from the lower cylinder wall 6b and the counterforce is generated by the closure needle 2 which, again, indicates that the closure needle 2 is not in its closing position.

Figure 2:
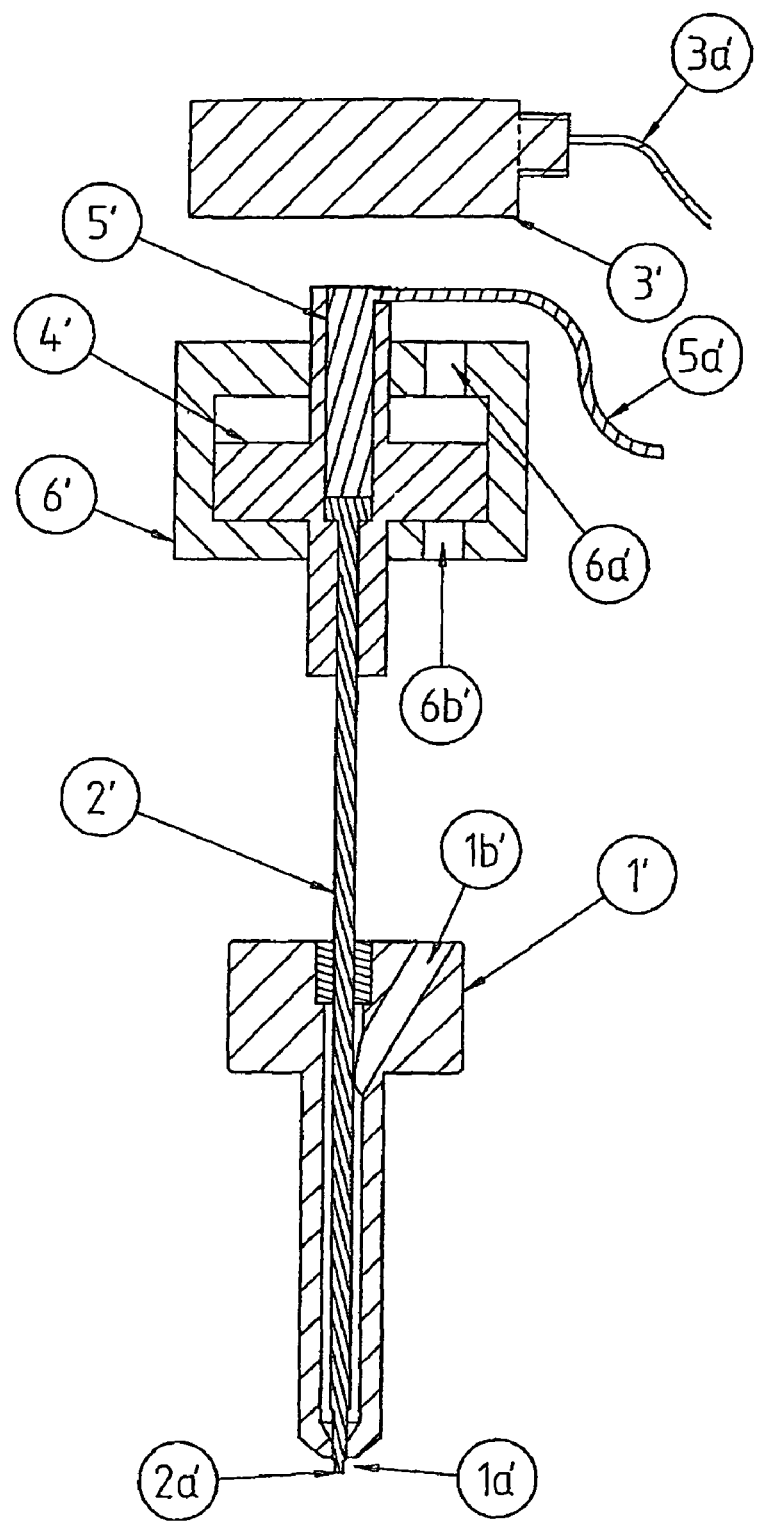
FIG. 2 is a schematic representation of a second arrangement according to the invention.

The arrangement as shown in FIG. 2 corresponds essentially to the arrangement as shown in FIG. 1. Identical elements are therefore indicated by the same reference numerals; for distinction, they are provided however with a mark.

In contrast to the embodiment as shown in FIG. 1, the position monitoring element is not formed by an electrical contact but by a proximity sensor 3'. As shown in FIG. 2, the proximity sensor 3' is arranged above the pneumatic cylinder comprising a piston 4' and a cylinder housing 6'. The proximity sensor 3' has preferably a measuring distance of zero to ten millimeter, a resolution of less than 0.01 millimeter and a repetition accuracy of less than 0.015 millimeter. The proximity sensor 3 is so arranged, or, respectively, so adjusted that it generates a signal when the piston 4' is disposed directly ahead of the lower wall of the cylinder housing 6'. That means the proximity sensor 3' generates a signal when the closure needle 2' is almost completely in its closing position.

When the piston 4' is disposed at a distance from the lower wall of the cylinder housing 6', the proximity sensor 3' does not provide any signal. The signal of the proximity sensor 3' is transmitted via a first signal line 3a' of a control device which is not shown in FIG. 2.

Otherwise, the operation of the arrangement shown in FIG. 2 corresponds to the operation of the arrangement shown in FIG. 1.

What is claimed is:

1. An injection molding tool, with at least one hot channel nozzle (1, 1'), including a discharge opening (1a, 1a') with a closure needle (2, 2') movably disposed in the hot channel nozzle (1, 1') for closing the discharge opening (1a, 1a'), an element (3, 3') for detecting an end position of the closure needle (2, 2'), and an operating element (4, 4') connected to the closure needle (2, 2) for moving the closure needle (2, 2'), the closure needle (2, 2') being connected to the operating element (4, 4') via a force sensor element (5) for determining a force transmitted by the closure needle (2, 2') at least in a discharge opening closing position of the closure needle.(2, 2').

2. An injection molding tool according to claim 1, wherein the element (3') is in the form of an electric switch.

3. An injection molding tool according to claim 2, wherein the closure needle (2') is movable by an operating element (4') into the closing position, wherein the operating element (4') includes a first contact of the switch (3') and a stop which is engaged by the operating element (4') in the closing position of the closure needle (2') comprises a second contact of the switch (3').

4. An injection molding tool according to claim 1, wherein the element (3) is a proximity sensor.

5. An injection molding tool according to claim 1, wherein the force sensor (5, 5') is a piezo element.

* * * * *